July 14, 1959  C. P. LECKIE  2,894,366
LEAD LINES FOR FISH NETS
Filed April 7, 1958
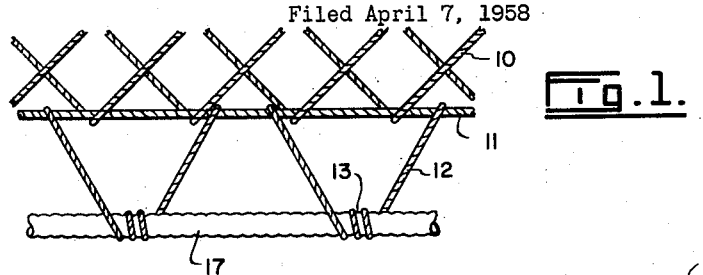
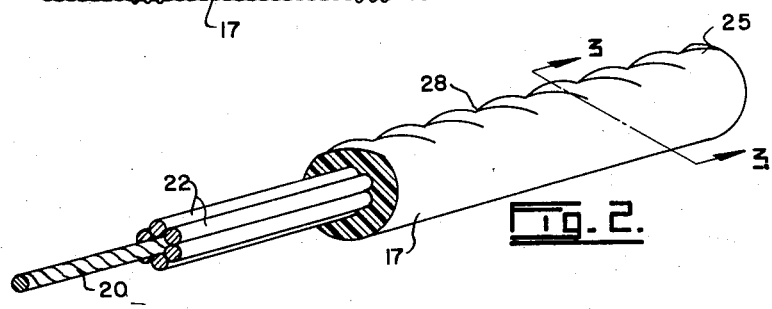
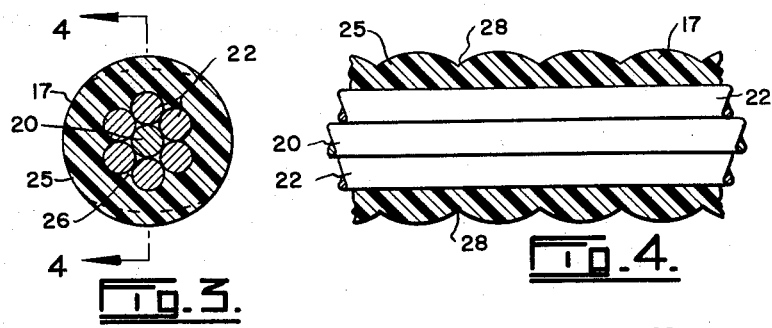
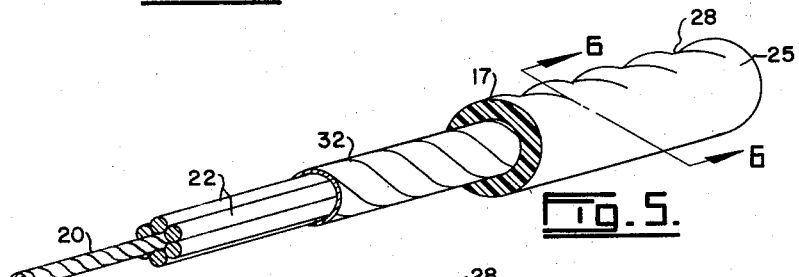
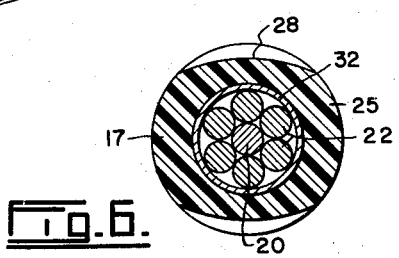
INVENTOR
CLAUDE PERRIN LECKIE
BY
Fetherstonhaugh & Co.
ATTORNEYS

United States Patent Office 2,894,366
Patented July 14, 1959

2,894,366

LEAD LINES FOR FISH NETS

Claude Perrin Leckie, Vancouver, British Columbia, Canada

Application April 7, 1958, Serial No. 726,817

13 Claims. (Cl. 57—149)

This invention relates to lead lines for fish nets of the type that are suspended from cork or float lines connected to edges thereof, the lead lines being attached to the opposite edges of the nets to weight said edges to keep the nets hanging substantially in vertical positions in the water during use.

Gillnets, seine nets are types of net which utilize lead lines. Floats or corks are attached to one edge of a gillnet or seine net, and a lead line is attached to the opposite edge thereof. When the net is in use, it hangs from the floats or corks in the water, and the lead line keeps the net in a substantially vertical position.

Traditionally, rope with leads molded or hammered thereon at spaced intervals has been used for lead lines. The lead line is attached along its length to the net edge by means of suitable twine, commonly known as "hangings" or "hanging twine." The hangings are spaced evenly when attached to the lead line to ensure proper proportion or looseness of the net web for maximum fishing efficiency. The prior lines and twine are subject to rot caused by fungus, bacteria, fish slime and mildew action. A weekly wash in a copper sulphate solution is usually done as a deterrent to this rotting action, but this merely slows down the action. Recently a lead line consisting of braided sisal over a single lead core has been used, but this does not eliminate the tendency to rot.

Another important factor to the fisherman concerning the lead line is the "hanging up" or tangling of nets caused by the netting catching on roughened edges of the lead weights. This results in a loss of time, and much inconvenience in unloosening the meshes from the rough leads. Braided nylon has been used in an attempt to eliminate the cost of replacing lead lines, but such lines are quite expensive.

The magnitude of the problem involved will be realized from the fact that the lead lines for some fish nets include approximately 1800 pounds of lead. Prior to this invention, many lead lines lasted only one season if not treated due to the rotting action and the terrific abrading force of the leads on the lines and net. Treated vegetable fibre lead lines will last from two to four years in salt water usage.

The present invention extends the life of a lead line many times over that of the lines in common use. It eliminates the leads on the outside of the line, resists rot and corrosion, eliminates the necessity of weekly washes, stands up to the terrific wear and tear to which a lead line is normally subjected, and yet the lead line retains the degree of flexibility required of such line. Furthermore, it does not shrink and stretch as is the case with fibre lines. It should be kept in mind that a lead line has to be about as flexible as an ordinary rope of the required strength.

A lead line according to the present invention includes a thin flexible core of high tensile strength. This core is intended to give the line considerable tensile strength without interfering with the flexibility thereof. The core may be made of any suitable material, such as polyethylene, stranded rope, nylon, terylene, or high tensile galvanized mild steel wire.

The lead line also includes a plurality of thin strands of lead surrounding the core and extending substantially parallel therewith, said strands being movable relative to each other and to the core when the line is flexed or bent. The number of lead strands depends upon the desired flexibility and the weight required. Each strand is made as thin as possible without sacrificing weight or strength. The strands are preferably in the form of lead wires of circular cross section, but they may be in the form of lead tapes of rectangular cross section.

A flexible tubular sheath surrounds the lead strands, is movable relative to said strands, and is formed of a plastic material unaffected by sea water and exposure, highly resistant to abrasion, and having substantial tensile strength. This sheath may be molded around the longitudinally-extending lead strands so that the material of the sheath extends into the spaces between said strands. This prevents the sheath from twisting around the strands. The sheath may be formed of any suitable material, such as polyvinyl chloride or polyethylene. Such a sheath has a smooth outer surface so that it does not catch in the net and produces a minimum of abrading action. It is preferable, although not absolutely necessary, to form at least one row of circumferentially-extending notches throughout the length of the tubular sheath. These notches are preferably in the form of smooth indentations so that they do not cause any difficulty, and yet prevent the hanging twine from slipping along the sheath.

If desired, a layer of thin tape may be wound spirally around the lead strands before the tubular sheath is applied thereto. In this case, the sheath is movable relative to the tape layer. It is preferable to use a smooth, strong tape, such as nylon. The taping forms a tube in which the lead strands can move relative to the plastic jacket. The easier the strands can move relative to the casing, the more flexible is the lead line. It has been found that extremely good results are obtained without the tape winding, but it may be used if desired.

The use of a plurality of lead strands makes this line much more flexible than it would be if a single lead core of the desired weight were used. In fact, a single lead core is impractical. The reason for this is that each lead strand can bend around a much smaller radius and much easier than a single lead core could. As the strands are free to move longitudinally of the line relative to each other and to the central core and the tubular sheath, this line can be flexed and bent quite easily despite the weight of the lead involved. Thus, the desired per foot weight in the line may be built up by means of the required number of lead strands while retaining a high degree of flexibility.

Examples of this invention are illustrated in the accompanying drawings, in which:

Figure 1 is a side elevation of the lower edge of a fish net with a lead line hanging therefrom, Figure 2 is a perspective view, partly in section, of one form of lead line according to this invention, Figure 3 is an enlarged cross sectional view taken on the line 3—3 of Figure 2, Figure 4 is a longitudinal sectional view taken on the line 4—4 of Figure 3, Figure 5 is a view similar to Figure 2 of an alternative form of lead line, and Figure 6 is an enlarged cross section taken on the line 6—6 of Figure 5.

Referring to the drawings, 10 represents a hanging fish net having the usual selvage 11 with hanging twine 12 secured to and hanging downwardly therefrom. The hanging twine is wrapped at spaced intervals a few times at 13 around a lead line 17 constructed according to this invention.

Figures 2 to 4 illustrate the lead line 17 in detail. This line is made up of a thin flexible core 20 of high tensile strength. A plurality of thin strands 22 of lead are arranged around the core and extend substantially parallel therewith. As these strands are loosely arranged, they are movable relative to each other and to the core when the line is flexed or bent. A close-fitting flexible tubular sheath 25 surrounds the lead strands. This sheath is preferably movable relative to the strands, and is formed of a suitable plastic material which is unaffected by sea water and exposure, highly resistant to abrasion, and has substantial tensile strength. It is preferable to mold the sheath around the strands. Although it is not necessary, it is desirable to mold the sheath in such a way that portions 26 thereof extend into the spaces between strands 22, see Figure 3. The portions 26 prevent the sheath from twisting around the lead strands.

Although the hanging twine 12 may be wrapped tightly around the lead line and tied thereto, it is preferable to provide sheath 25 throughout the length thereof with at least one row of notches 28 which extend part way therearound in a circumferential direction. Figure 4 illustrates a row of notches 28 along the upper and lower sides of the lead line. It will, however, be understood that only one row may be used, or several such rows may be used.

When the lead line 17 is attached to net 10 by twine 12, the latter is wrapped around the line at spaced points 33, and these windings fit into the notches 28 of the lead line. These notches do not need to be very deep, and they are not formed with sharp edges, as clearly shown in Figure 4, but they are sufficient to prevent the hanging twine from slipping longitudinally along the lead line. The outer surface of sheath 25 is smooth so that the net is never hung up on the lead line, and the latter does not abrade the net during handling and use.

The lead line of Figures 5 and 6 is quite similar to that of Figures 2 to 4. The only difference is that the former is provided with a layer of tape 32 wound spirally around the lead strands. The tubular sheath surrounds the tape layer and the latter prevents any portion of the sheath from entering the spaces between the lead strands 22. This layer of tape enables the strands to move very easily relative to the tubular sheath.

The above-described lead line has a smooth plastic sheath which eliminates rotting, is unaffected by sea water and exposure, and is highly resistant to abrasion. The plastic material has considerable tensile strength which adds to the total strength of the lead line. The fish net is not harmed by contact with this lead line so that the damage resulting from a chafing action is eliminated, and yet the line is extremely flexible in spite of its weight. This represents a forward step in the fishing industry.

What I claim as my invention is:

1. A lead line for a fish net of the type that is suspended from a cork line connected to an edge thereof, the lead line being attached to the other edge of the net to weight said edge to keep the net hanging substantially in a vertical position, comprising a thin flexible core of high-tensile strength, a plurality of thin strands of lead surrounding the core and extending substantially parallel therewith, said strands being movable relative to each other and the core when the line is flexed or bent, and a flexible tubular sheath surrounding the lead strands, said sheath being movable relative to the lead strands and being formed of a plastic material unaffected by sea water and exposure, highly resistant to abrasion, and having substantial tensile strength.

2. A lead line as claimed in claim 1 in which the flexible core is a thin rope formed of nylon.

3. A lead line as claimed in claim 1 in which the flexible core is a thin rope formed of polyethylene.

4. A lead line as claimed in claim 1 in which the flexible core is formed of high tensile galvanized mild steel wire.

5. A lead line as claimed in claim 1 in which the flexible core is a thin rope formed of terylene.

6. A lead line as claimed in claim 1 in which the tubular sheath is formed of polyethylene.

7. A lead line as claimed in claim 1 in which the tubular sheath is formed of polyvinyl chloride.

8. A lead line as claimed in claim 1 in which the tubular sheath is formed throughout the length thereof with at least one row of circumferentially-extending notches.

9. A lead line as claimed in claim 1 in which the tubular sheath is molded around the longitudinally-extending lead strands, the material of said sheath extending into the spaces between the lead strands, thereby preventing the sheath from twisting around the strands.

10. A lead line for a fish net of the type that is suspended from a cork line connected to an edge thereof, the lead line being attached to the other edge of the net to weight said edge to keep the net hanging substantially in a vertical position, comprising a thin flexible core of high-tensile strength, a plurality of thin strands of lead surrounding the core and extending substantially parallel therewith, said strands being movable relative to each other and the core when the line is flexed or bent, a layer of tape wound spirally around the lead strands, and a flexible tubular sheath surrounding the tape layer and lead strands, said sheath being movable relative to the tape layer and being formed of a plastic material unaffected by sea water and exposure, highly resistant to abrasion, and having substantial tensile strength.

11. A lead line as claimed in claim 10 in which the tubular sheath is formed with at least one longitudinal row of circumferentially-extending notches.

12. A lead line as claimed in claim 10 in which the sheath is a polyethylene tube.

13. A lead line as claimed in claim 10 in which the sheath is a polyvinyl chloride tube.

References Cited in the file of this patent

UNITED STATES PATENTS

| | | |
|---|---|---|
| 2,383,095 | Wallace | Aug. 21, 1945 |
| 2,791,979 | Willis | May 14, 1957 |